United States Patent [19]

Kramer

[11] Patent Number: 5,427,236
[45] Date of Patent: Jun. 27, 1995

[54] DISC PACKAGE

[75] Inventor: Robert G. Kramer, Cincinnati, Ohio

[73] Assignee: The C.W. Zumbiel Co., Cincinnati, Ohio

[21] Appl. No.: 262,763

[22] Filed: Jun. 20, 1994

Related U.S. Application Data

[62] Division of Ser. No. 89,250, Jul. 9, 1993.

[51] Int. Cl.⁶ .............................................. B65D 85/57
[52] U.S. Cl. ...................................... 206/310; 206/313
[58] Field of Search ................ 206/307, 309, 310, 311, 206/312, 313

[56] References Cited

U.S. PATENT DOCUMENTS

| | | |
|---|---|---|
| 1,010,442 | 12/1911 | Menger . |
| 1,666,001 | 4/1928 | Catala . |
| 1,732,214 | 10/1929 | Amez-Droz . |
| 2,304,307 | 12/1942 | Hollis . |
| 2,374,346 | 4/1945 | Habif . |
| 2,673,642 | 3/1954 | Smalley . |
| 2,675,911 | 4/1954 | Thurston . |
| 2,680,512 | 6/1954 | Young . |
| 2,698,083 | 12/1954 | Palson . |
| 3,353,657 | 11/1967 | Young . |
| 4,176,744 | 12/1979 | Borzak . |
| 4,496,050 | 1/1985 | Kirchner et al. . |
| 4,635,792 | 1/1987 | Yamada et al. . |
| 4,709,812 | 12/1987 | Kosterka . |
| 4,793,479 | 12/1988 | Otsuka et al. . |
| 4,793,480 | 12/1988 | Gelardi et al. . |
| 4,819,799 | 4/1989 | Nomula et al. . |
| 4,925,023 | 5/1990 | Goldblatt . |
| 5,088,599 | 2/1992 | Mahler . |
| 5,096,055 | 3/1992 | Opper . |
| 5,101,971 | 4/1992 | Grobecker . |
| 5,176,250 | 1/1993 | Cheng ............................ 206/313 X |
| 5,188,229 | 2/1993 | Bernstein . |
| 5,246,107 | 9/1993 | Long et al. ..................... 206/312 X |
| 5,322,162 | 6/1994 | Melk .............................. 206/311 X |

*Primary Examiner*—Jacob K. Ackun
*Attorney, Agent, or Firm*—Wood, Herron & Evans

[57] ABSTRACT

A disc package comprised of a paperboard carton adapted to store, e.g., a compact disc, and a separate paperboard sleeve of substantially the same thickness as the carton. The carton is slideable into and out of a shallow seat defined at one end of the sleeve. When the carton is seated in the sleeve, the assembly so formed is enclosed within a wrap to establish a disc package for a retail store's shelf. The sleeve cooperates with the carton when seated one with the other to provide an extended package length so that the package cannot be easily concealed by a retail consumer in order to protect against prospective retail store theft. The sleeve is thrown away after the package has been unwrapped, and after the carton has been separated from it. However, the carton itself is reusable, and constitutes a permanent storage box for the disc.

10 Claims, 5 Drawing Sheets

DISC PACKAGE

This is a division of application Ser. No. 08/089,250, filed Jul. 9, 1993.

This invention relates to packages. More particularly, this invention relates to a package particularly structured for use with a disc, e.g., a compact disc, or a record, or a video disc, or the like.

The packaging art is replete with various packages and packaging systems for discs such as, e.g., compact discs, video discs, records, and the like. One disc package widely used for compact discs in current commercial practice is comprised of a disc carton, and a rectangular long box within which the disc carton (and, therefor, the disc) is received for the purpose of creating a retail consumer package. The disc carton is in the form of a square thin carton having a cover and a disc tray hinged together, the compact disc being seated on the disc tray. The disc carton is for holding the compact disc during its distribution to the retail consumer, as well as for storing the compact disc by the consumer after it has been purchased. The disc carton is enclosed within the long box for distribution and sale at a retail store display. The purpose of the long box is to aid in theft prevention at the retail store distribution level.

The long box is discarded by the retail consumer after the disc package is purchased, only the disc carton being kept for subsequent storage purposes.

There are several environmental type problems associated with this prior art disc package system which applicant's invention overcomes. First, often the disc carton, as well as the long box, are fabricated from plastic materials. This means that any information and graphics to be provided with the retail package must be printed on separate paper enclosed within the package. And perhaps more importantly, plastic materials often are not environmentally sensitive in the first place, i.e., are not bio-degradable. Second, the long box must be of a length sufficient to enclose the disc carton within same, i.e., the disc carton is fully enclosed within the long box, and will not be visible to the retail consumer unless the long box is transparent. This is undesirable in that it requires two cartons to market a compact disc, with this kind of a package system, i.e., a first carton for the disc, and a second box for the disc carton. And third, the prior art disc cartons that are often commercially used for compact discs are structured such that it may be difficult for the retail consumer to remove the disc from the carton for use after the carton's cover is opened. In other words, there is no assist mechanism associated with the prior art compact disc cartons which can aid the user in removal of the disc from the carton as the carton's cover is opened.

Accordingly, it has been a primary objective of this invention to provide an improved disc package in which a disc carton is received in a shallow seat defined in one end of a sleeve, the combined length of the carton and the sleeve when in seated relation one with the other being substantially greater than the length of either the carton by itself or the sleeve by itself, thereby providing a disc package in which the carton and the sleeve cooperate together to define an extended length package instead of the disc carton being wholly received within an extended length box.

It has been another primary objective of this invention to provide a novel disc carton where the carton's cover includes a lift device connected to it that is operable, as the cover swings open, to lift one disc edge and depress an opposite disc edge so as to move the disc to an intermediate inclined position relative to the carton's floor in order to allow a user to remove the disc from the carton more easily than would be the case if the disc remained in parallel stored position relative to the floor when removal was desired.

In accord with these objectives, applicant's invention is described in detail below in combination with the drawings in which.

Figure 1:
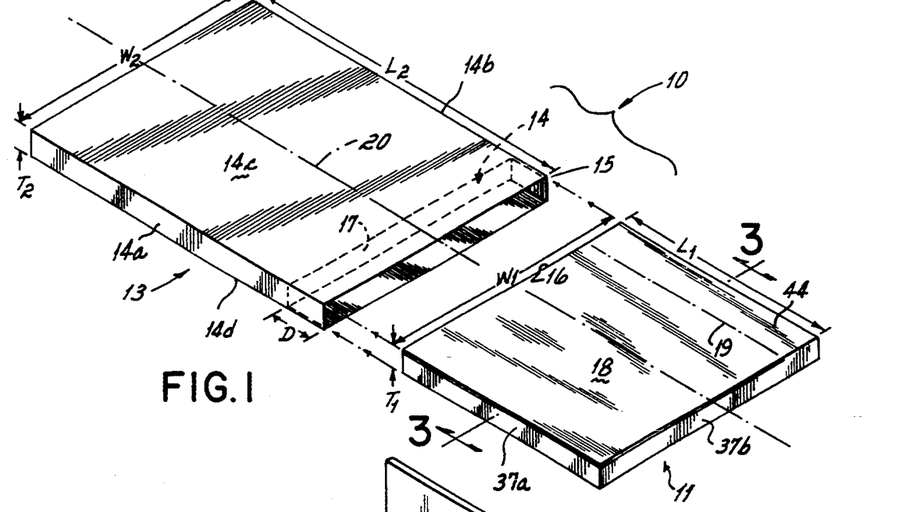
FIG. 1 is a perspective view of a disc carton and a sleeve, i.e., a disc package, in accord with the principles of this invention, the carton and the sleeve being shown separated one from the other.

The disc package 10 in accord with the principles of this invention is basically illustrated in FIG. 1. The disc package 10 includes a carton 11 for a disc 12, e.g., a compact disc. The carton 11 has a thickness $T_1$ sufficient to receive the disc 12 in storage relation, and is of a first length $L_1$ and a first width $W_1$. The disc package 10 also includes a sleeve 13 that defines a shallow seat 14 at one end 15 of that sleeve. The sleeve 13 has a thickness $T_2$ substantially the same as the thickness $T_1$ of the disc carton 11, and it has a width $W_2$ substantially the same as the width $W_1$ of the disc carton. But the sleeve 13 is of a second length $L_2$ substantially greater than the first length $L_1$ of the disc carton 11. The sleeve's shallow seat 14 is of a depth D, and is sized and configured to receive one end 16 of the disc carton 11 in end to end seated relation (not shown) therewith. In this seated relation, the disc carton's end 16 is abutted against the seat's floor 17 of the seat so that the combined length of the disc carton 11 and the sleeve 13 when same are in seated relation one with the other is substantially greater than either the first length $L_1$ of the disc carton or the second length $L_2$ of the sleeve, i.e., is substantially equal to length $L_1$, plus length $L_2$ minus the seat depth D. Preferably the sleeve's seat 14 has a depth D no greater than about one-half the length $L_1$ of the disc carton 11, and most preferably has a depth no greater than about one-fifth of the length $L_1$ of the carton. Note particularly that the sleeve seat 14 is defined partially by the sleeve's narrow opposing side walls 14a, 14b, and partially by the sleeve's opposing top and bottom walls 14c, 14d, that seat only requiring a floor 17 extending between the sleeve's narrow side walls to complete the seat structure. The carton 11 has a cover 18 which pivots on hinge line 19. Note particularly this hinge line 19 is oriented parallel to a longitudinal axis 20 defined by the carton 11 and the sleeve 13 when the carton and the sleeve are assembled one with the other. And the cartons' cover wall is of a length substantially equal to the disc carton's length $L_1$. This means that the carton's cover 18 itself is prevented from opening when in assembled relation with the sleeve 13 because the sleeve seat 14 prevents the cover 18 from pivoting on the hinge line 19 when the disc carton is seated with the sleeve. When the disc carton 11 and the sleeve 13 are in seated relation, i.e., in disc package form, same are jointly enclosed with a wrap (not shown) in the form of, e.g., a transparent shrink wrap in order to provide a finished package suitable for distribution to consumers through a retail sales outlet. This wrap (not shown) prevents the carton 11 and the sleeve 13 from being unseated one with the other until the wrap is removed from the overall package. Preferably both the disc carton 11 and the sleeve 13 are fabricated from one piece paperboard blanks 25, 26, respectively, see FIGS. 6 and 9.

The disc package 10 illustrated in FIG. 1 provides several advantages over those known to the prior art. First, note particularly that the disc carton 11 itself is of a length $L_1$, that constitutes a major and significant part of the overall length of the disc package. In other words, the disc carton 11 is not wholly enclosed in any sense within the sleeve 13. This means that significant material, e.g., paperboard, is saved in that the sleeve 13 need not be of a total length sufficient to fully enclose the disc carton. Second, and since the disc carton 11 and the sleeve 13 are both preferably made of paperboard, any graphics and information to be printed or to be provided with the disc package 10 can be simply printed directly onto either the sleeve and/or the carton. Indeed, any such information and graphics in fact will be printed on the disc carton 11 as well as on the sleeve 13 since both will be exposed to the retail consumer if a transparent shrink wrap (not shown) is used to enclose both the disc carton and the sleeve to prevent same from being unseated one with the other as the disc package 10 passes through marketing channels for distribution to the retail consumer.

Figure 2:
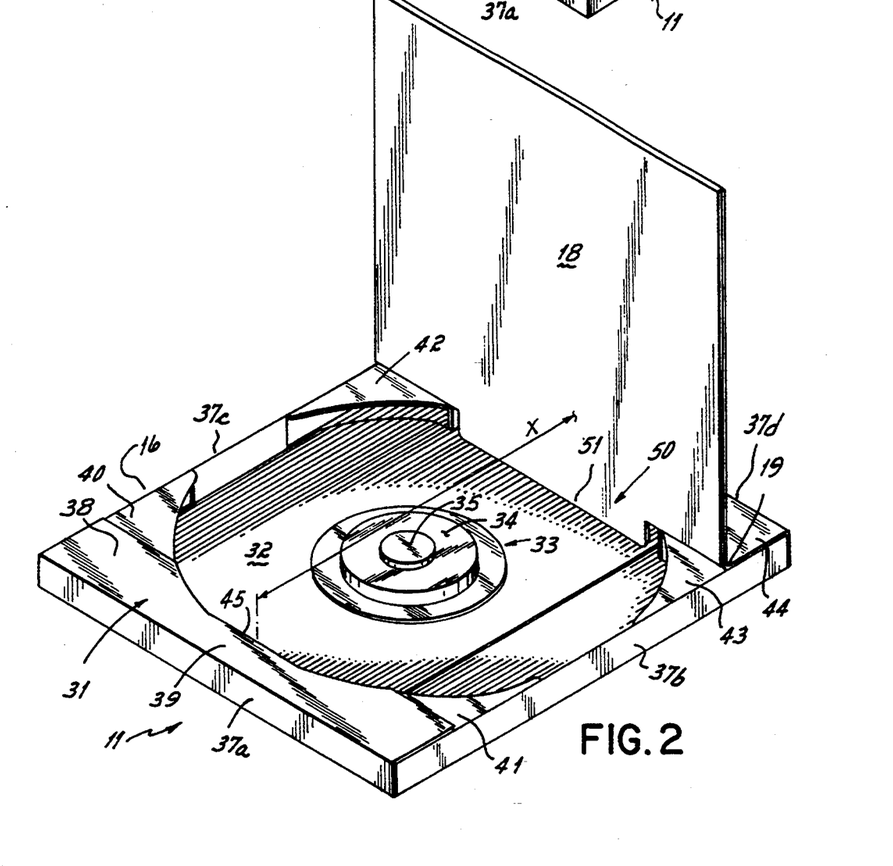
FIG. 2 is a perspective view of the disc carton in accord with the principles of this invention, the carton's cover being illustrated in the open position.
Figures 3, 4, 4A:
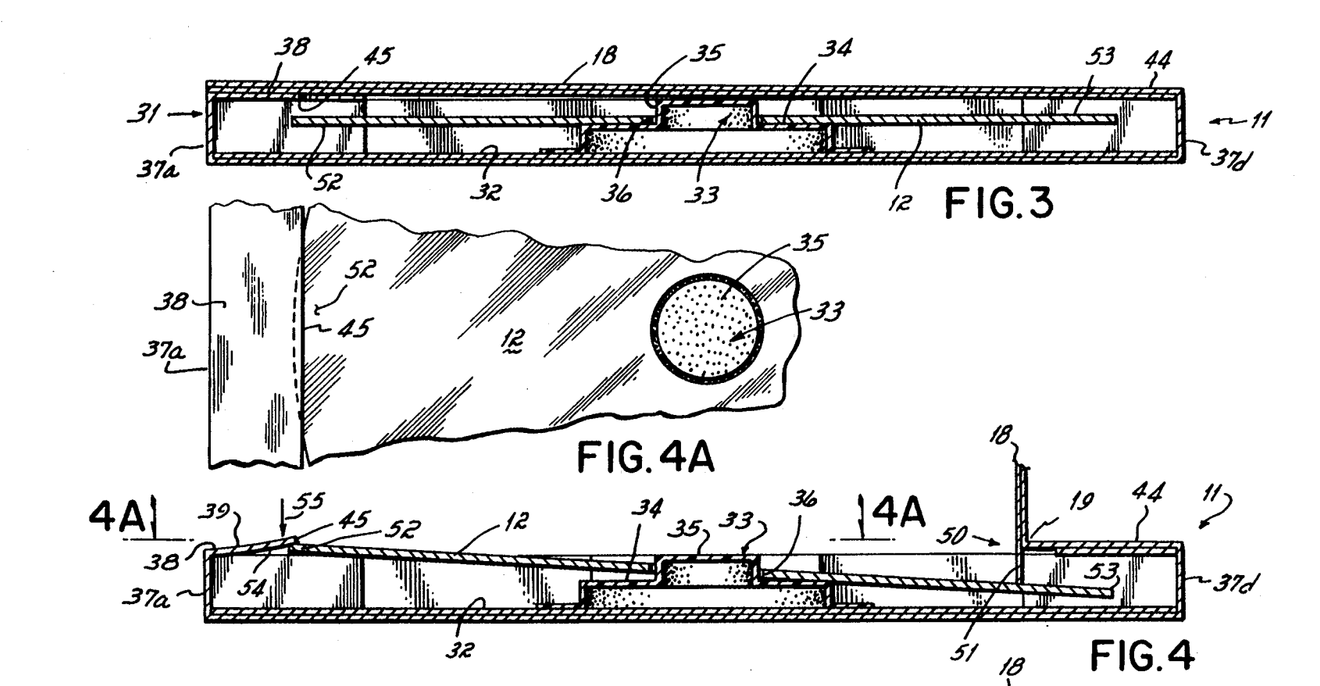
FIG. 3 is a cross-sectional view taken along lines 3—3 of FIG. 1 with the disc carton's cover closed.
FIG. 4 is a cross-sectional view similar to FIG. 3, but shown with the carton's cover opened, and with the compact disc in a first intermediate removal position.
FIG. 4A is a fragmentary elevational view taken along line 4A—4A of FIG. 4.
Figure 5:
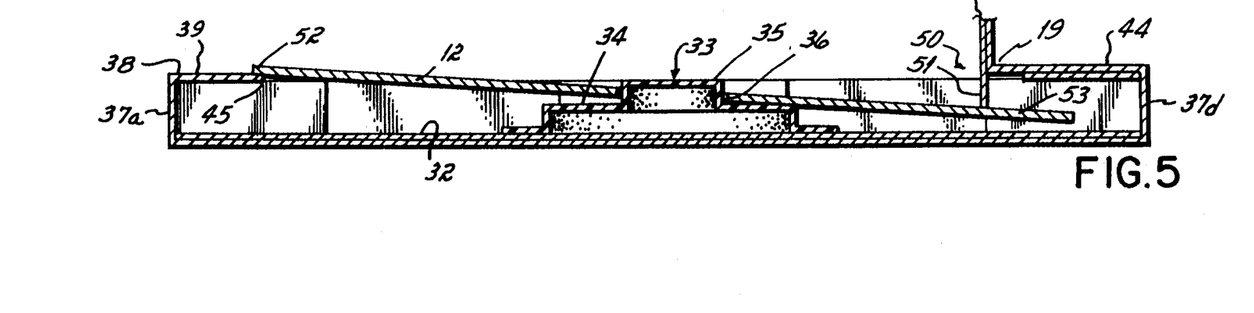
FIG. 5 is a view similar to FIG. 4, but showing the compact disc in a second intermediate removal position.

A disc carton 11 in accord with the principles of this invention is illustrated in FIGS. 2-5. The disc carton 11 is of a generally square configuration, and includes the cover 18 and a base 31. The base 31 includes a floor 32 on which is fixed a step disc mount 33. The disc mount 33 includes a support surface 34 upraised from the floor 32 on which the compact disc 12 is supported above the floor in a position generally parallel to the floor during storage of the disc in the carton 11, see FIG. 3. The disc mount 33 also includes a spindle 35 over which the compact disc's spindle hole 36 is received in order to prevent side-to-side disc 12 movement within the carton 11, also as shown in FIG. 3. In addition to the floor 32, the carton 11 has side walls 37a, 37b, 37c, 37d of a generally narrow width, sufficient only to receive the compact disc 12 in spaced relation as shown in FIG. 3, between the cover 18 and the floor 32. The disc carton 11 also includes a top wall 38 comprised basically of an open end section 39, corner sections 40, 41, 42, 43, and a cover end section 44. These top wall sections 39-44 define a cutout top wall 38 to allow ingress and egress of the compact disc 12 relative to the step disc mount 33. And this cutout top wall 38, as shown in FIG. 2, is sized so that the distance X from the vertically opened cover 18 to inner edge 45 of the open end top wall section 39 is less than the diameter of the compact disc 12 to be stored within the disc carton.

The carton's cover 18 includes a lift device 50 in the form of a foot panel 51 connected to the cover. Note the foot panel 51 is integral with and generally co-planar with the cover 18, the cover extending to one side of cover hinge line 19 and the foot panel 51 extending to the opposite side of the cover hinge line. The lift device 50 is operable as the cover 18 swings open to lift one disc edge 52 and to depress an opposite disc edge 53 in order to move the disc to a first intermediate incline position relative to the carton's floor 32, see FIG. 4. This foot 51 is out of contact with the disc 12 when the cover 18 is closed so that the disc 12 will assume its horizontal storage position, see FIG. 3. Note in the first intermediate incline position, as shown in FIG. 4, that the lifted disc edge 52 is moved into abutting relation with a temporary stop 54 defined by the underside of the carton's open end top wall section 39. This temporary stop 54 prevents the compact disc 12 from inadvertently falling out on the floor simply because the carton's cover 18 is opened. Subsequently, and in order to remove the disc 12 from the carton 11, the user operates the temporary stop 54 by pushing it toward the carton's floor 32 in the direction shown by arrow 55 which allows the disc edge 52 to be released from the temporary stop 54 so it can be easily lifted out of the carton 11 by the user. This function is achievable in the first place because the compact disc 12 is made of a flexible material, and in the second place because the disc carton 11 is fabricated from paperboard which also is a flexible material, thereby allowing the free edge 45 of the carton's open end top wall section 39 to be pushed past the edge 52 of the compact disc 12.

Figure 6:
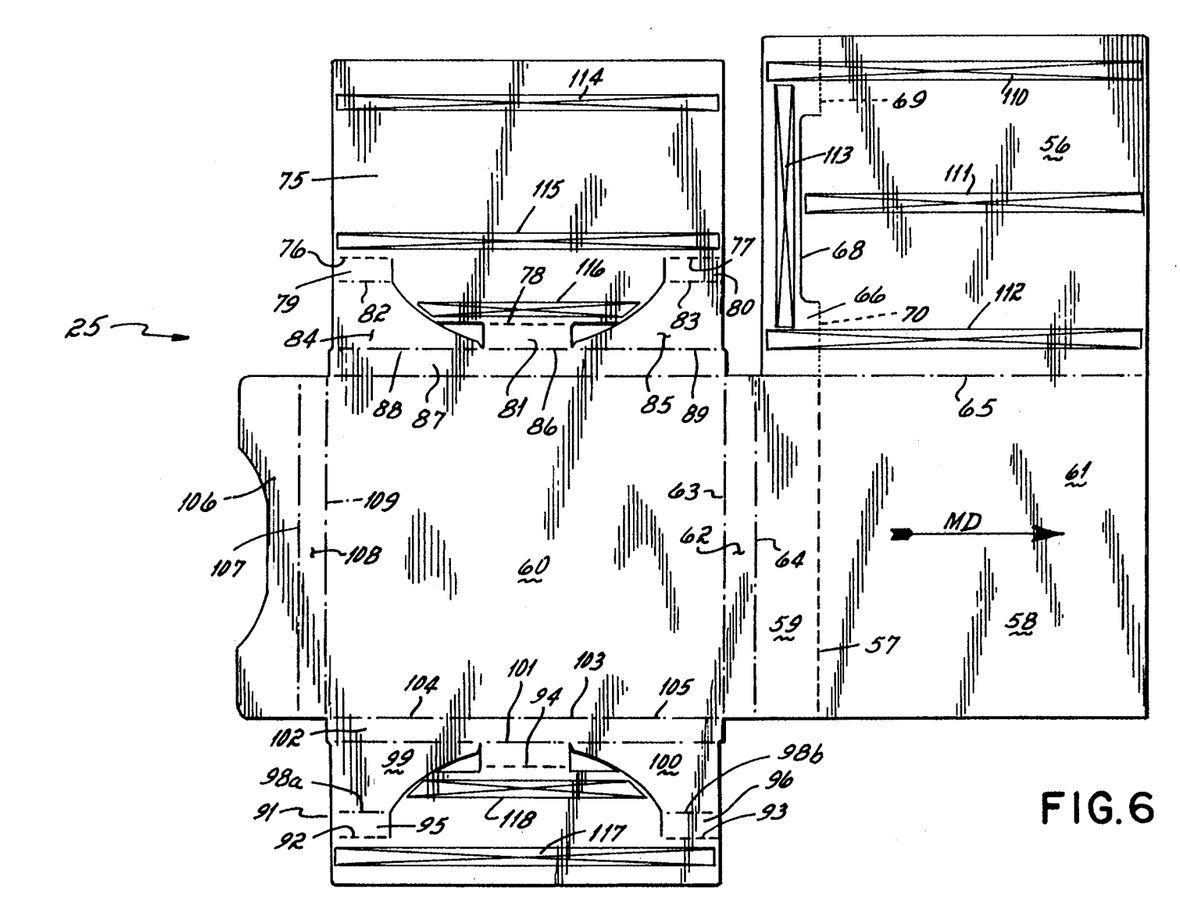
FIG. 6 is a top plan view of a disc carton blank from which the disc canon shown in FIGS. 1 and 2 is fabricated.

The disc carton 11 is fabricated from a blank 25 illustrated particularly in FIG. 6. The carton blank 25 includes a floor panel 60 and a cover panel 61 spaced one from the other by a side wall panel 62, the side wall panel being foldably connected on score line 63 to the floor panel and being foldably connected on score line 64 to the cover panel. Note the cover panel 61 is itself comprised of the carton's primary cover 58 and a cover end wall panel 59, which are hingedly connected on hinge line 57. The cover panel 61 is also comprised of a secondary cover wall panel 56 foldably connected to the primary cover panel 58 on score line 65. The secondary cover wall panel 56 is adapted to overlay and be glued to the cover panel as explained in detail below to provide a cover 18 of double thickness. The secondary cover wall panel 56 also includes a cover end reinforcement panel 66, the lift foot panel 51 being defined and cut out of same along cut line 68. The secondary cover wall panel 56 defines tear lines 69, 70 co-axial with the cover hinge line 19. Note, therefor, that the secondary cover wall panel 56 is foldably connected to the cover panel 58 on score line 65 that is perpendicular to the hinge and tear lines 57, 69 and 70.

Figure 8:
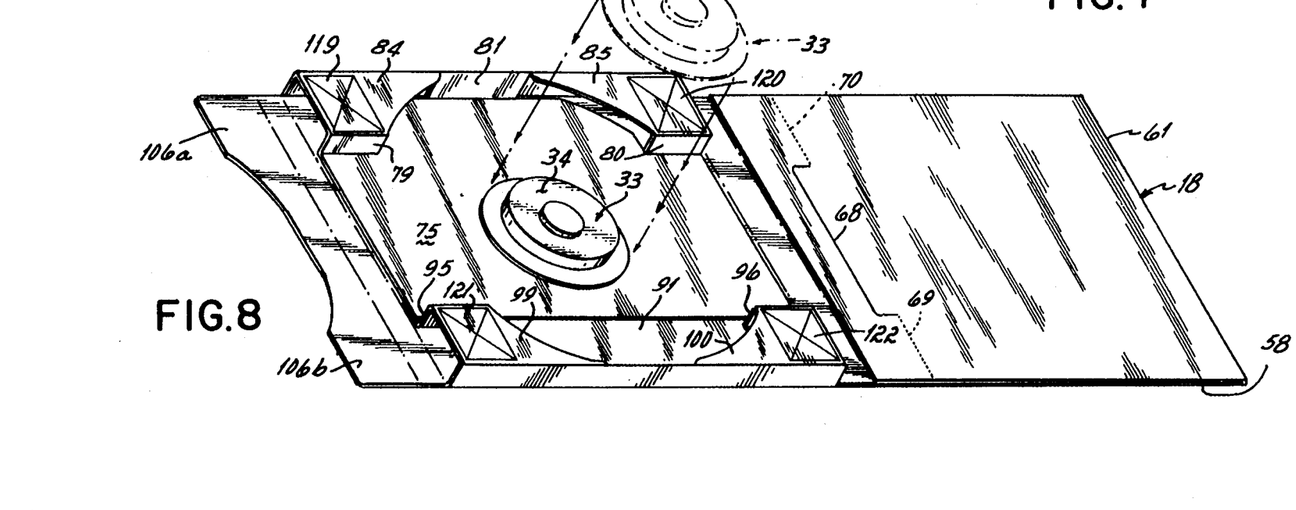
FIG. 8 is a perspective view of the disc carton shown in FIG. 7 illustrating final assembly of the disc carton when it is popped up into three dimensional use attitude from the two dimensional flattened attitude shown in FIG. 7.

A first double floor section panel 75 is foldably connected on score lines 76, 77 and 78 to spacer wall panels 79, 80, 81, respectively. The spacer wall panels 79, 80 are each connected on score lines 82, 83, respectively, to corner top wall panels 84, 85. And spacer wall 81 is foldably connected on score line 86 to side wall panel 87. This side wall panel 87 is foldably connected on co-axial score line 88, 89 to the corner top wall panels 84, 85, respectively, and is also connected by score line 90 to the floor panel 60. The first double floor section panel 75 is located to one side of the floor panel 60, and along with its associated panels establishes a part of the carton's top wall 38 as explained in further detail below. A second double floor section panel 91 is foldably connected on score lines 92, 93 and 94 to spacer wall panels 95, 96, 97, respectively. The spacer wall panels 95, 96 are foldably connected by score lines 98a, 98b to corner top wall panels 99, 100. And the spacer wall 97 is foldably connected on score line 101 to another side wall panel 102. This other side wall panel 102 is also foldably connected on coaxial score lines 104, 105 to corner top wall panels, respectively, and the side wall panel 102 is also foldably connected on score line 103 to the floor panel 60. Thus, the first 75 and second 91 double floor section panels cooperate to establish a double thickness floor 32 for the disc carton 11, and are each associated with corner top wall 84, 85 and 99, 100 and spacer wall panels 79-81 and 95-97, respectively, to establish corner top wall sections 40-43 at the four corners of the carton 11 as shown in FIG. 8, and as described in greater detail below. An open end top wall panel 106 is foldably connected on score line 107 to side wall panel 108 which, in turn, is foldably connected on score line 109 to the last edge of the floor panel 60.

Figure 7:
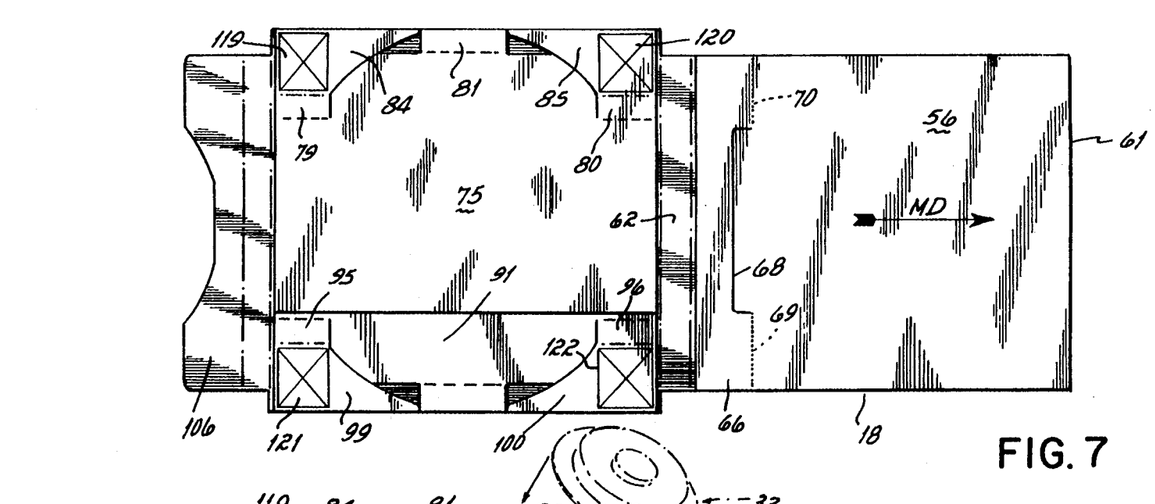
FIG. 7 is a view similar to FIG. 6 but showing the disc canon in a partially assembled but flattened carton attitude.

Assembly of the disc carton blank 25 is illustrated in FIGS. 6-8, the direction of the carton blank through the gluing and folding equipment being illustrated by the machine direction arrow MD. The first assembly step, as shown in FIG. 6, is to provide glue areas 110-113 on the faces of the secondary cover wall panel 56, and to provide glue areas 114-116 and 117-118, respectively, on the first 75 and second 91 double floor section panels, as illustrated. Subsequently and as shown in FIG. 7, the secondary cover wall panel 56 is folded on score line 65 into overlying relation with the primary cover panel 61, the first double floor section panel 75 is folded over onto the floor panel 60 on score line 86, 88, 89, and the second double floor section panel 91 is folded over onto the floor panels 60, 75 on score line 101, 104, 105. This first gluing and folding step, in the case of the secondary cover wall panel 56, glues the cover end reinforcement panel 66 to the cover end top wall panel 59, and glues the secondary cover wall panel 56 to the primary cover panel 61. Also, this first gluing and folding step glues the first double floor section panel 75 and the second double floor section panel 91 securely to each other and to the floor panel 60 to form the carton floor 32. In the FIG. 7 attitude, the disc carton 11 is partially assembled, but is in a folded flat intermediate assembly attitude. And in this FIG. 7 attitude, a series of such flatted cartons can be easily stacked one on top the other and shipped to the prospective end user.

When a FIG. 7 flatted disc carton is received by a user, the disc mount 33 is centrally located and fixed to the carton's floor 32 as shown in FIG. 8. The carton 11 is then provided with glue on areas 119-122 of the corner top wall panels 84, 85, 99, 100, respectively, as illustrated in FIGS. 7 and 8, and those top wall panels are then popped up from their flattened attitude shown in FIG. 7 into the erected attitude shown in FIG. 8. Subsequently, the open top end wall panel 106 is folded on score lines 109 and 107 so that end sections 106a, 106b of that open end top wall panel are adhered to glue areas 119, 121 of the associated corner top wall panels 84, 99. And the cover 61, 56 is folded on score lines 63 and 64 so that the cover end reinforcement panel 59/69 is glued to the glue areas 120, 122 on the associated corner top wall panels 85, 100. Subsequently, and when the cover 18 is opened to the FIG. 2 attitude, the secondary cover wall panel 56 will be broken away from the cover end reinforcement panel 59 because of the tear lines 69, 70 that permit that breakaway, but the primary cover panel 61 itself will remain foldably connected to the cover end top wall panel 59 because of the score type hinge line 57 between the primary cover panel 61 and the cover end top wall panel 59. Further, and since the lift foot 51 is cut out of the cover end reinforcement panel 66 on cut line 68, the lift foot also will pivot relative to the carton's hinge line 19 when the cover 18 is opened as shown in FIG. 2.

Figure 9:
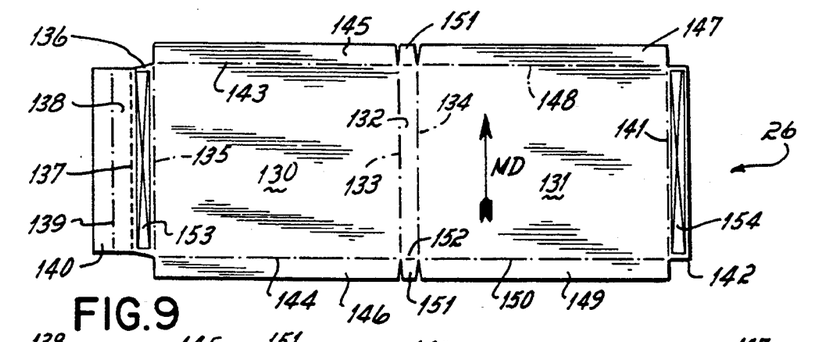
FIG. 9 is a top plan view of a sleeve blank from which the sleeve shown in FIG. 1 is fabricated.
Figure 10:
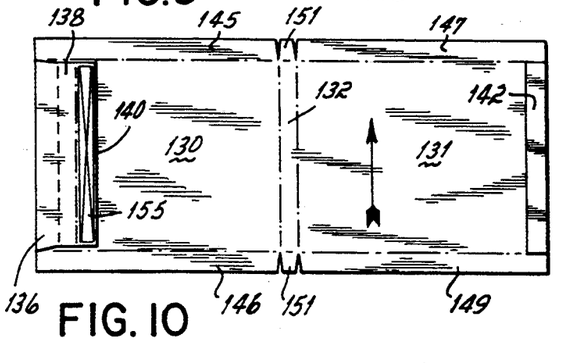
FIG. 10 is a view similar to FIG. 9 but showing a first assembly step for the sleeve.

The sleeve blank 26 in accord with the principles of this invention, and the assembly thereof from its blank configuration, is illustrated in FIGS. 9-12. As shown in FIG. 9, the sleeve blank 26 includes a first face wall panel 130 and a second face wall panel 131 separated one from the other by an end wall panel 132. The first face wall panel 130 is foldably connected to the end wall panel 132 on score line 133, and the second face wall panel 131 is foldably connected to that end wall panel on score line 134. The free top edge of the first face wall panel 130 is connected on score line 135 to a double seat wall panel 136 which, in turn, is connected on score line 137 to a seat floor panel 138 which, in turn, is connected on score line 139 to forming flap panel 140. The free top edge of the second face wall panel 131 is connected on score line 141 to a second double seat wall panel 142. The leading and trailing edges of the first wall panel 130, relative to the machine direction MD of the sleeve blank 26 as it is glued and folded, are connected on score line 143, 144 to a glue flaps 145, 146, respectively. The leading and trailing edges of the second face wall panel 131, relative to the machine direction MD that the sleeve blank 26 follows as it is folded and glued, includes a side wall panel 147 connected on score line 148 to the leading edge and a side wall panel 149 connected on score line 150 to the trailing edge. Each end of the sleeve blank's end wall panel 132 is provided with a dust flap 151 foldably connected thereto on score lines 152.

Figure 11:
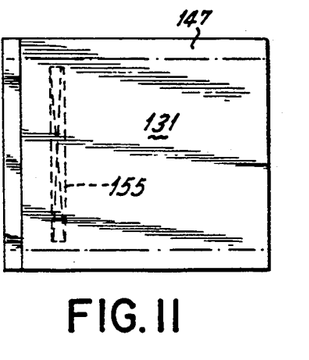
FIG. 11 is a view similar to FIG. 10 but showing a second assembly step for the sleeve, this figure showing the sleeve in a partially assembled but flattened carton attitude.

In assembly of the sleeve blank 26, and as shown in FIG. 9, glue is first applied to the glue areas 153, 154 of the first double seat wall panel 136 and the second double seat wall panel 142, respectively. The first double seat wall panel 136 is then folded on score line 135 onto the interior surface of the first face wall panel 130 so as to glue it to same, and the second double seat wall panel 142 is then folded on score line 141 onto the interior surface of the second face wall panel 131 where it is glued to same. Subsequently, the forming flap 140 is provided with glue in glue area 155, and the second face wall panel 131 is folded on score line 134 onto the first face wall panel 130 so that the forming flap 140 is glued to the inside surface of the second face wall panel 131 as shown in FIG. 11. In this FIG. 11 attitude, the partially assembled sleeve is collapsed and flat, and can be easily shipped to a user.

Figure 12:
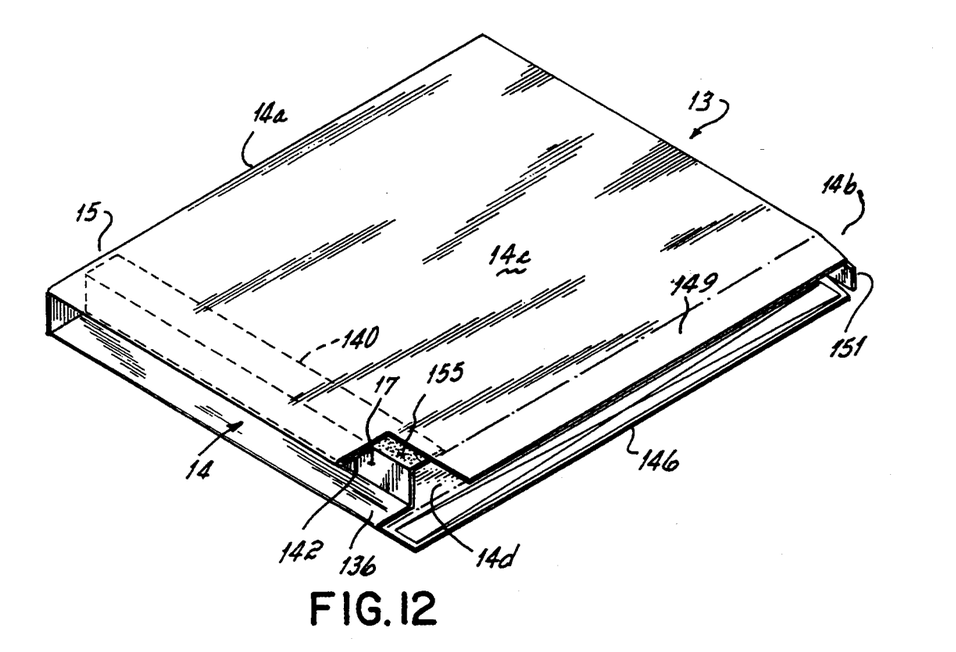
FIG. 12 is a partially broken away perspective view of the sleeve shown in FIG. 11 illustrating final assembly of the sleeve where it is popped up into three dimensional use attitude from the two dimensional flattened attitude shown in FIG. 7.

When it is desired to erect the FIG. 11 partially assembled sleeve, same is initially popped up into the three dimensional configuration illustrated in FIG. 12 which creates the sleeve's seat 14. In this FIG. 12 attitude, glue is applied to glue area 156 on the inner surfaces of the respective glue flaps 145, 146. Subsequently, the dust flaps 151 are folded inwardly and the side walls panels 147, 149 are folded on score lines 148, 150, and the glue flaps 145, 146 folded thereover on score lines 143, 144, so as to complete assembly of the sleeve 13 shown fully assembled in FIG. 1.

Having described in detail the preferred embodiment of my invention, what I desire to claim and protect by Letters Patent is:

1. A disc carton for a disc with a spindle hole, said carton comprising
    a base having a floor,
    a stepped disc mount fixed to said floor, said disc mount having a support up raised off said floor on which said disc is supported above said floor in a position generally parallel to said floor during storage of said disc in said carton, said disc mount also having a spindle over which said disc spindle hole is received in order to prevent side to side disc movement within said carton,
    a cover hingedly connected to said base, and
    a lift device connected to said cover, said lift device being operable as said cover swings open to lift one disc edge and depress an opposite disc edge relative to said disc mount for moving said disc to an intermediate inclined position relative to said floor in order to allow a user to remove said disc from said disc mount and said carton more easily than would be the case if said disc was in said parallel position relative to said floor when removal was desired.

2. A disc carton as claimed in claim 1, said carton comprising
    a foot connected with said cover, said foot being adapted to contact said disc as said cover swings open to move said disc to said intermediate inclined position, but said foot being out of contact with said disc when said cover is closed so that said disc is in said horizontal storage position.

3. A disc carton as claimed in claim 1, said base comprising
    a top wall connected to said floor, said top wall being cut out to allow ingress and egress of said disc relative to said stepped disc mount, said cover being hingedly connected to said top wall.

4. A disc carton as claimed in claim 3, said foot comprising
    a foot panel integral and generally parallel with said cover, said cover extending to one side of a cover hinge line and said foot panel extending to an opposite side of said cover hinge line.

5. A disc carton as claimed in claim 1, said carton comprising
    a temporary stop connected to said carton above said floor, said opposite disc edge being moved into abutting relation with said temporary stop when said disc is moved to said inclined position, said disc being removable from said carton after said temporary stop is removed from abutting relation with said disc.

6. A disc carton as claimed in claim 5, said temporary stop being operable by pushing said stop toward said floor when said opposite disc edge is in abutting relation therewith, thereby allowing said opposite disc edge to be released from said temporary stop for removal from said carton.

7. A disc carton as claimed in claim 6, at least one of said disc and said temporary stop being fabricated from a flexible material.

8. A disc carton as claimed in claim 5, said carton comprising
    a foot connected with said cover, said foot being adapted to contact said disc as said cover swings open to move said disc to said intermediate inclined position, but said foot being out of contact with said disc when said cover is closed so that said disc is in said horizontal storage position.

9. A blank for a disc carton, said carton blank comprising
    a floor panel,
    a primary cover panel foldably connected to said floor panel, and
    a lift foot panel foldably connected to said primary cover panel, said lift foot panel being glueable to said primary cover panel when folded onto same, said lift foot panel defining a lift foot operable of a disc stored with said disc carton when erected from said blank to move said disc to an intermediate inclined position relative to said floor in order to allow a user to remove said disc from said carton more easily than would be the case if said disc was in a parallel position relative to said floor when removal was desired.

10. A disc carton blank as claimed in claim 9, said carton blank comprising
    a temporary stop panel foldably connected to said floor panel, said opposite disc edge being moved into abutting relation with said temporary stop when said disc is moved to said inclined position when said carton blank is erected, said disc being removable from said carton after said temporary stop is removed from abutting relation with said disc.

* * * * *

UNITED STATES PATENT AND TRADEMARK OFFICE
CERTIFICATE OF CORRECTION

PATENT NO. : 5,427,236

DATED : June 27, 1995

INVENTOR(S) : Robert G. Kramer

It is certified that error appears in the above-identified patent and that said Letters Patent is hereby corrected as shown below:

Column 2, line 28 please cancel "canon" and insert in its place --carton--.

Column 2, line 31, please cancel "canon" and insert in its place --carton--.

Signed and Sealed this

Third Day of October, 1995

Attest:

BRUCE LEHMAN

Attesting Officer     Commissioner of Patents and Trademarks